(12) United States Patent
De Peuter et al.

(10) Patent No.: US 8,301,755 B2
(45) Date of Patent: *Oct. 30, 2012

(54) IMPACT PROPAGATION IN A DIRECTED ACYCLIC GRAPH

(75) Inventors: Geert De Peuter, Turnhout (BE); David Bonnell, Reading (GB)

(73) Assignee: BMC Software, Inc., Houston, TX (US)

( * ) Notice: Subject to any disclaimer, the term of this patent is extended or adjusted under 35 U.S.C. 154(b) by 975 days.

This patent is subject to a terminal disclaimer.

(21) Appl. No.: 11/956,507

(22) Filed: Dec. 14, 2007

(65) Prior Publication Data

US 2009/0157723 A1    Jun. 18, 2009

(51) Int. Cl.
*G06F 15/173* (2006.01)
(52) U.S. Cl. .................... 709/224; 709/223
(58) Field of Classification Search .......... 709/224
See application file for complete search history.

(56) References Cited

U.S. PATENT DOCUMENTS

| | | | |
|---|---|---|---|
| 3,878,465 A * | 4/1975 | Stephenne et al. | 375/251 |
| 6,041,049 A | 3/2000 | Brady | |
| 6,249,755 B1 | 6/2001 | Yemini et al. | |
| 6,738,893 B1 | 5/2004 | Rozas | |
| 6,765,863 B1 | 7/2004 | Wakimoto et al. | |
| 6,983,321 B2 | 1/2006 | Trinon et al. | |
| 7,424,530 B2 | 9/2008 | Chagoly et al. | |
| 7,580,813 B2 | 8/2009 | Thiesson et al. | |
| 8,051,164 B2 | 11/2011 | De Peuter et al. | |
| 2002/0184568 A1 | 12/2002 | Kurrasch | |
| 2003/0012145 A1 | 1/2003 | Bragg | |
| 2003/0220860 A1 | 11/2003 | Heytens et al. | |
| 2004/0015929 A1* | 1/2004 | Lewis et al. | 717/156 |
| 2004/0046785 A1 | 3/2004 | Keller | |
| 2004/0049372 A1 | 3/2004 | Keller | |
| 2005/0021742 A1 | 1/2005 | Yemini et al. | |
| 2005/0049988 A1 | 3/2005 | Dahlquist et al. | |
| 2006/0010337 A1 | 1/2006 | Suzuki | |
| 2006/0059027 A1 | 3/2006 | Berenbach et al. | |
| 2006/0161466 A1 | 7/2006 | Trinon et al. | |
| 2006/0239211 A1 | 10/2006 | Previdi | |
| 2007/0140245 A1 | 6/2007 | Anjum et al. | |
| 2008/0034313 A1* | 2/2008 | Hildebrand | 715/772 |
| 2008/0240129 A1 | 10/2008 | Elmeleegy et al. | |
| 2008/0298276 A1 | 12/2008 | Chen et al. | |
| 2009/0157723 A1 | 6/2009 | Peuter et al. | |
| 2009/0292720 A1 | 11/2009 | Peuter et al. | |
| 2010/0142409 A1 | 6/2010 | Fallon et al. | |
| 2010/0161532 A1 | 6/2010 | Becker | |

OTHER PUBLICATIONS

Leiserson et al.; "Parallel Algorithms for the Circuit Value Update Problem;" © 1995 ACM. To appear at SPAA 95.

(Continued)

*Primary Examiner* — Dohm Chankong
*Assistant Examiner* — Neeraj Utreja (57) ABSTRACT

A method, system and medium for efficiently propagating service impact data in a directed acyclic graph. One or more service components, impact rules and business rules will be grouped together into a directed acyclic graph and a related metadata array. Impact propagation uses related metadata array to minimize traversal of the graph. As nodes of the graph are updated to propagate impact data a determination is made as to when no further impact propagation is required and calculations are terminated without having to traverse the entire graph. This method will allow a system or business administrator to maintain real-time notification and visualization of, the impacted state of all objects in the graph.

25 Claims, 10 Drawing Sheets

OTHER PUBLICATIONS

U.S. Appl. No. 11/956,522 Notice of Allowance mailed Jul. 13, 2011, 5 pages.
Non-Final Office Action received for U.S. Appl. No. 11/956,522, mailed on May 19, 2010, 18 pages.
Non-Final Office Action received for U.S. Appl. No. 11/956,522, mailed on Oct. 14, 2010, 8 pages.
Response to Non-Final Office Action filed for U.S. Appl. No. 11/956,522, filed Jan. 14, 2011, 8 pages.

* cited by examiner

IMPACT PROPAGATION IN A DIRECTED ACYCLIC GRAPH

CROSS-REFERENCE TO RELATED APPLICATIONS

This application is filed concurrently with U.S. patent application Ser. No. 11/956,522, entitled "Impact Propagation in a Directed Acyclic Graph Having Restricted Views," having inventors Geert De Peuter and David Bonnell, which is incorporated herein by reference in its entirety.

BACKGROUND

Impact propagation is one of the most frequently used and costly calculations required in systems management. For example, impact calculation and propagation typically require extensive computing resources and recursive traversal of large service model graphs that may have hundreds of thousands or even millions of nodes. A company's success today is integrally linked with its information technology (IT) services. Any disruptions or degradations in IT service can cause serious, even catastrophic, damage to business. That means that IT professionals are under considerable pressure to ensure that required IT service levels are delivered to users. Considering the complexity and dynamic nature of today's enterprise networks, it can be quite a challenge to achieve the high levels of service users require. Efficient impact propagation is important for properly managing the complexity and dynamic nature of today's enterprise systems so that the delivery of IT services can remain closely aligned with business requirements.

Because of the nature of system or service monitoring, it is likely that multiple impacting events (e.g. computer off-line or sub-network outage) will have to be processed at the same time or in close proximity to each other and furthermore, that these events often result in overlapping impact sets (the set of graph nodes impacted by a given event). As a result, traditional impact propagation techniques often require redundant graph traversal and impact calculations.

For example, a disk outage (i.e. alarm state) may affect the service level at a computer and may send that computer or a particular business function executing on that computer into WARNING or ALARM state. If the particular business function affected by the outage is accounts receivable, the service impact model would be updated to reflect the accounts receivable service is impacted in some way.

SUMMARY

Service impacts are efficiently propagated in a data structure representing a service impact model. The data structure is a directed acyclic graph. One or more service components, impact rules, and business rules are grouped together into the directed acyclic graph and related metadata array. The impact propagation uses the related metadata array to minimize graph traversal. As the nodes of the graph are updated to propagate impact data, a determination is made as to when no further impact propagation is required. Subsequently, the calculations are terminated without having to traverse the entire graph. This method improves the performance and scalability of a real-time impact propagation system, allowing a system or business administrator to view and receive real-time notification of the impacted state of large, complex service models.

DETAILED DESCRIPTION

Figure 1:
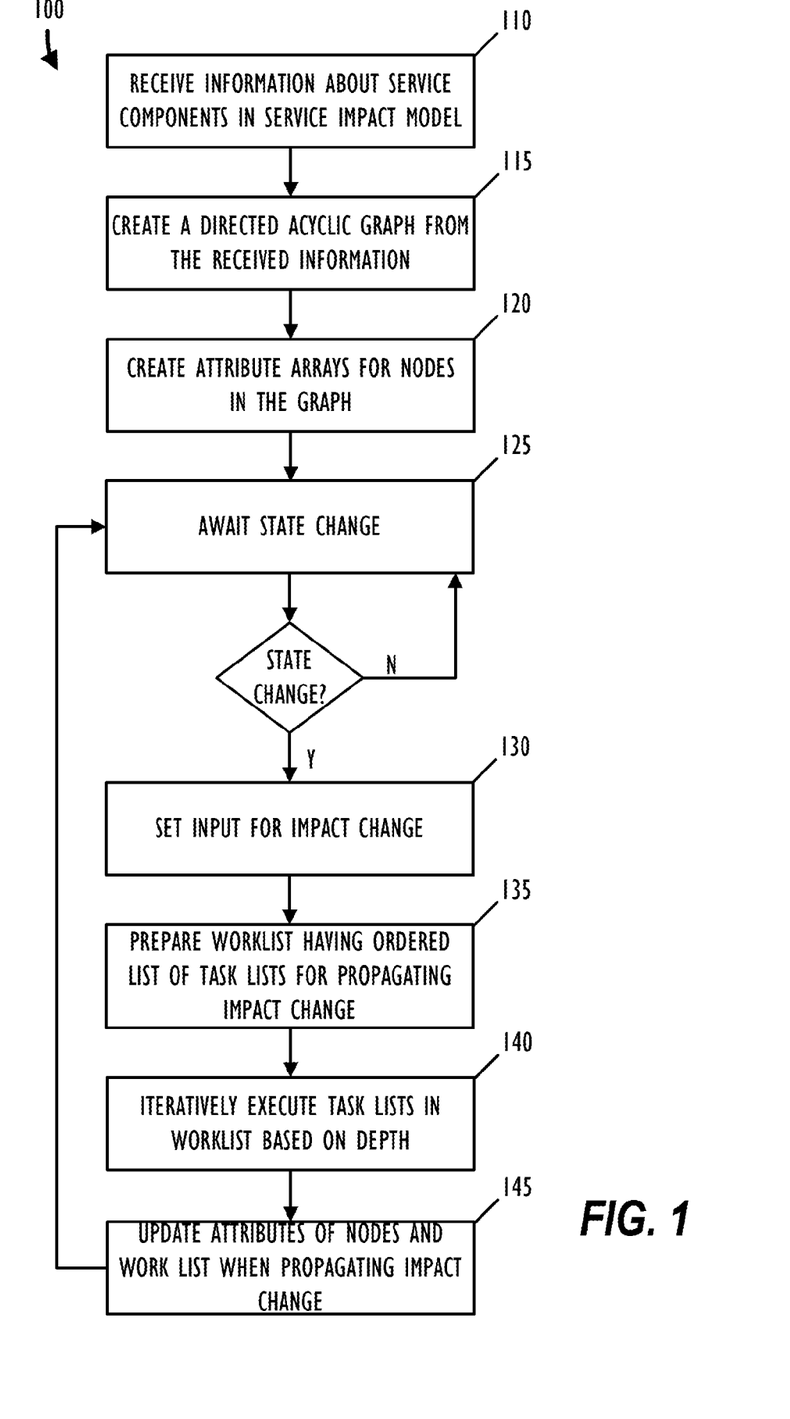
FIG. 1 illustrates a propagation process according to the present disclosure.
Figure 2:
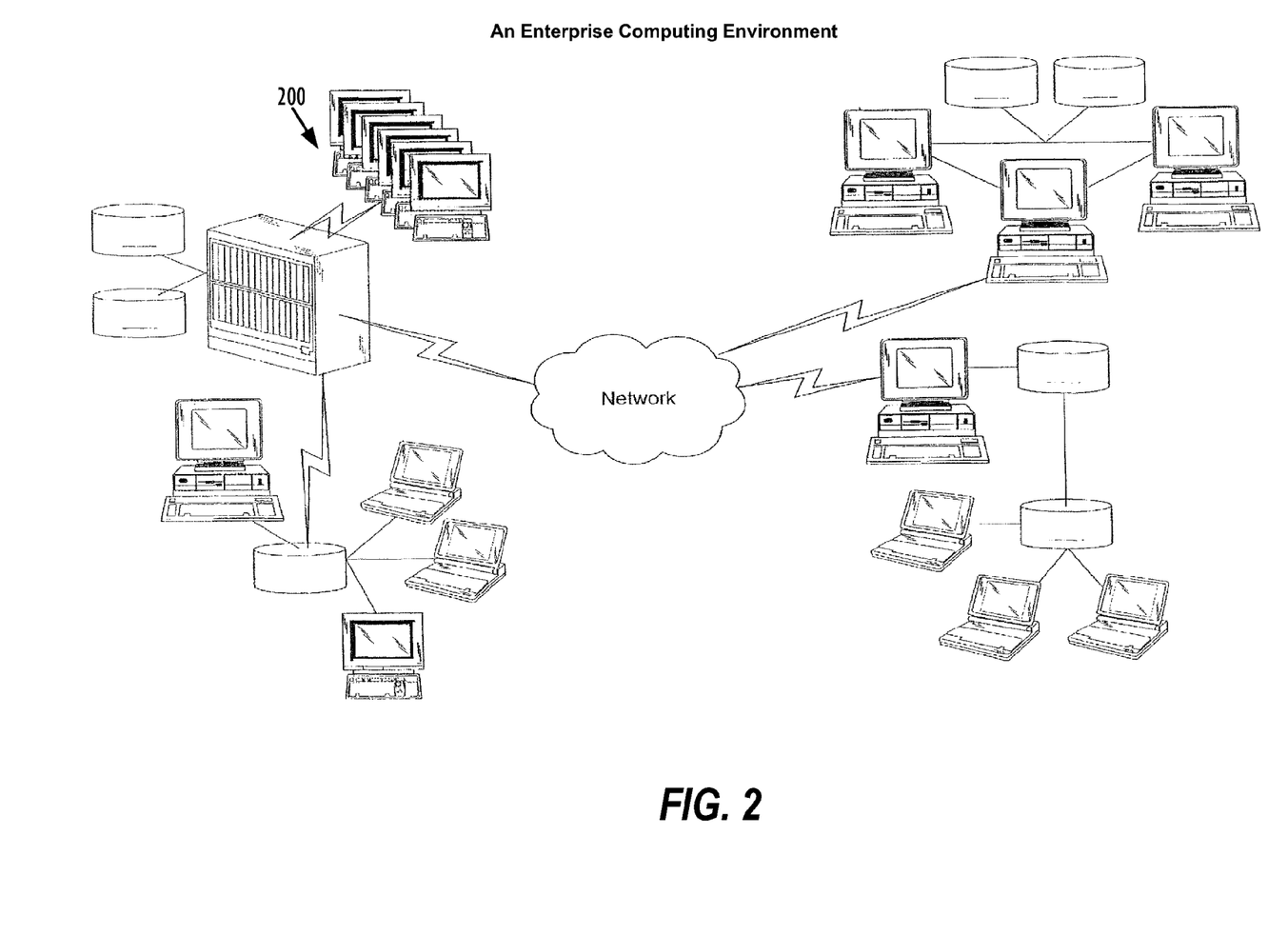
FIG. 2 illustrates an example enterprise computing environment on which the process of FIG. 1 can be implemented.

FIG. 1 shows an impact propagation process 100 according to the present disclosure. An example computing environment 200 on which impact propagation process 100 can be executed is shown in FIG. 2. In general, the computing environment 200, such as an enterprise computing environment, has various system components, such as computers, servers, routers, storage devices, databases, etc. One or more components can execute systems management software that receives information about other components in the computing environment 200 to create a service impact model. The service impact model is a directed acyclic graph containing service components. The directed association between service components in the graph defines an impact relationship between the service components. Service components may represent system components or any logical or physical resource, function, process or service necessary for efficient business operation. A service component may also be referred to simply as a component.

Depending on the various impact relationships between components, a state change occurring at one component may affect one or more other components. To handle such contingencies, propagation process 100 of FIG. 1 tracks the service components' states and propagates any state change's impact along the impact relationships between the components. Using the systems management software, an end user can then review the components' states and analyze the business service operations described by the service impact model.

Initially, process 100 executing on systems management software receives information about service components of FIG. 2 (Block 110). The received information can include information about service component type, ID, state, relationships with other service components, cost, responsible person, owner, service level agreements, operating hours, etc. From the received information, process 100 creates a data structure (e.g., a directed acyclic graph such as in FIG. 3) (Block 115).

Figure 3:
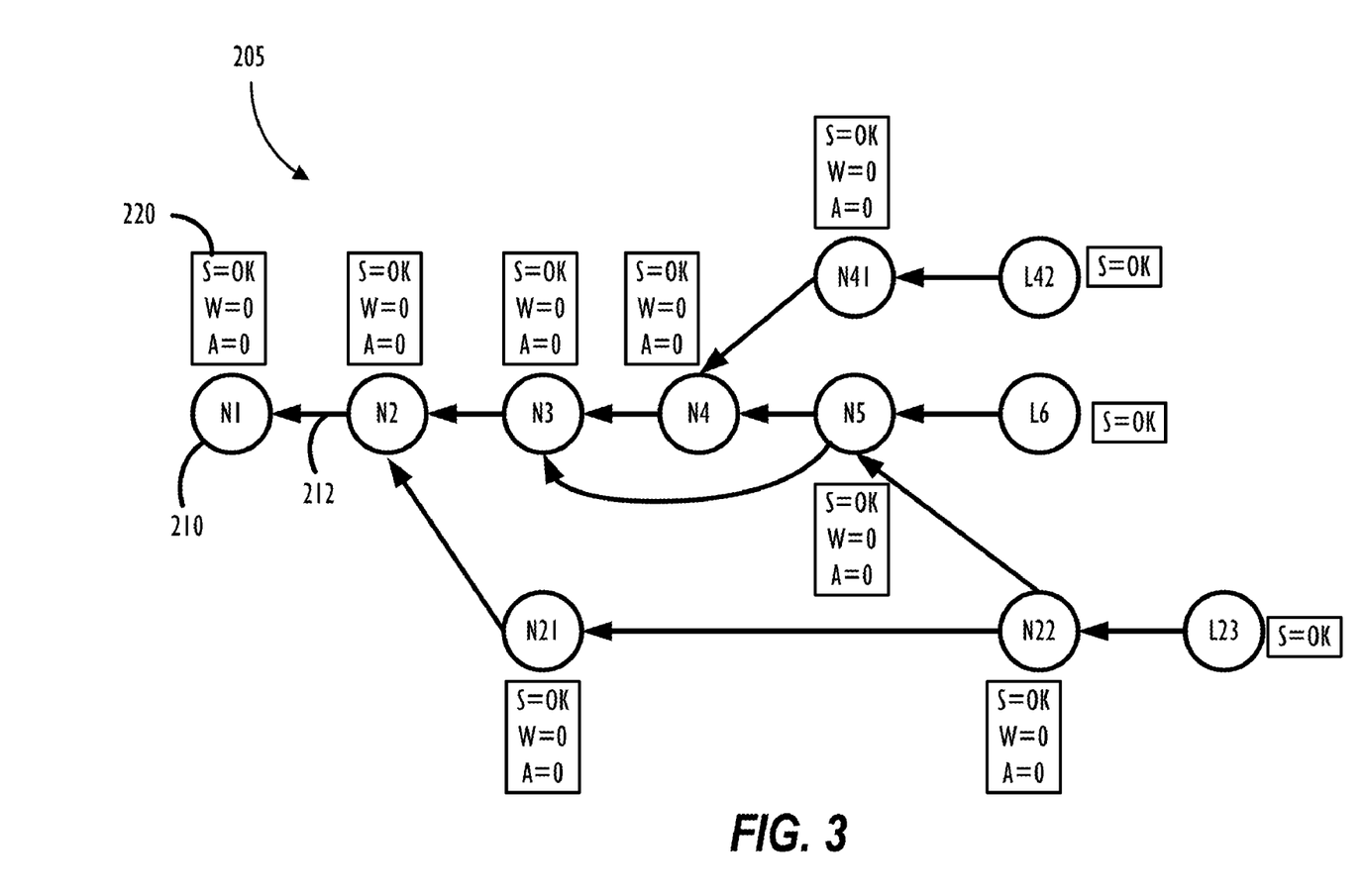
FIG. 3 illustrates a directed acyclic graph in its initial state with reference counters.

In context of system service management, graph 205 of FIG. 3 can represent a business network's service impact model. As such, the directed acyclic graph has nodes 210 representing the service components and has directed edges 212 (arrows) representing an impact relationship between at least some components. For illustrative purposes, graph 205 has eleven nodes 210 (e.g., nodes N1, N2, N3, etc.). Using graph 205, support staff (e.g., system administrators) can manage the entire range of service level agreement (SLA) processes.

Because graph 205 is a directed graph with no directed cycles, no directed path exists for any given node 210 in graph 205 that both starts and ends at that node. Such a directed acyclic graph 205 can be considered as a generalization of a tree in which certain sub-trees can be shared by different parts of the tree. Each node 210 represents a particular business or information technology component, and directed edges 212

(arrows) represent an impact relationship between those two components. Node 210 from which edge 212 flows is often called the child, while node 210 to which edge 212 flows is referred to as the parent. A node 210 which has no child nodes is referred to as a leaf node.

To facilitate impact propagation according to the present disclosure, each node 210 in graph 205 has one or more attributes 220 associated with it. Accordingly, process 100 creates attribute arrays for nodes 210 in graph 205 (Block 120). Details of attributes 220 are discussed in more detail below. In general, attributes 220 are used as input and output for the service model impact calculations.

Whenever a state change occurs in the service impact model (Blocks 125), process 100 of FIG. 1 calculates the state changes to nodes 210 in graph 205 by propagating a change impact along all directed edges 212 on each node 210 dependent on the state change. When a given node 210's state changes, for example, that change must be propagated along all directed edges 212 proceeding from the given node 210 so that the impact of that change can be calculated on all other nodes 210 in the service model that depend on that given node 210 either directly or indirectly. This process is called impact propagation. Different types of state changes may be treated differently.

To do this, process 100 sets inputs for the impact change (Block 130) and prepares a work list having an ordered task lists for propagating the impact change (Block 135). As discussed in more detail below, these task lists use attributes 220 associated with nodes 210 to efficiently propagate the impact change through graph 205.

The task lists within the work list contain accumulated impact propagation tasks for nodes 210 at a single depth in graph 205. Therefore, each task list also has an implicit depth. Task lists within the work list are iteratively executed by process 100 in descending order of depth (Block 140). Node 210's specific depth is defined as the maximum of the node's parents plus one. The root node (e.g., node N1) has a depth of zero. For reference, the Depth table below identifies the depth from root node N1 for each of the other ten nodes.

Depth Table

| Depth | Node |
| --- | --- |
| 0 | N1 |
| 1 | N2 |
| 2 | N3 |
| 2 | N21 |
| 3 | N4 |
| 4 | N5 |
| 4 | N41 |
| 5 | L6 |
| 5 | L42 |
| 5 | N22 |
| 6 | L23 |

A child node always has a lower depth in graph 205 than its parent nodes. When a state change is propagated from a child node to a parent node, for example, the tasks executed in the task list instruct the parent's state to be re-calculated.

When calculating its state, a node may use different impact calculation functions. In this way, different sub-graphs of a single service model can behave differently. For example, a parent node representing a function provided by redundant components can take that redundancy into account when determining its own status. When only a single of the redundant components is unavailable, the parent may therefore determine that its state is OK. Edges 212 can otherwise be weighted to reflect the relative importance of the relationship between two nodes 210, and a child node may take this into consideration when updating attributes 220 of its parent node.

Part of executing the tasks when propagating the impact change involves updating attributes 220 for nodes 210 so that attributes 220 reflect the current impacted state (Block 145). Once the one or more task lists in the work list have been iteratively executed (Block 140), process 100 has finished propagating the impact change through graph 205. To propagate the change efficiently, process 100 uses the above steps to ensure that each node 210 does not need to re-calculate its state more than once during processing of a single work list. At this point, process 100 can await a new state change should it occur by returning to block 125.

Just as the impact propagation function can vary when propagating an impact change, so too can the semantics of the output state computed by the function. In systems management, one common type of output state is a discrete "status," such as OK, WARNING or ALARM. Impact propagation of states is often referred to as state propagation. Because state propagation of such discrete statuses is commonly used in systems management, it will be used in the examples of the present disclosure. However, it will be appreciated that the disclosed techniques are in no way limited to this particular case. In addition to such discrete statuses as OK, WARNING, or ALARM, for example, the impact propagation function can just as easily compute the state of each node as percentage availability, level of operational throughput, or some other operational state indicative of the node's operation.

Exemplary Attributes for Nodes of the Directed Acyclic Graph

As noted previously, various attributes 220 are used to facilitate impact propagation through graph 205 according to the present disclosure. Each node 210 has attributes 220 that include reference counts for tracked states (e.g., WARNING "W" and ALARM "A"). For each tracked state, the reference count represents the count of children impacting that node with that state. In FIG. 3, for example, attributes 220 include a first reference count for a WARNING state ("W") and a second reference count for an ALARM state ("A"). If two direct children have a state of WARNING, then the reference count for the WARNING state W will be "2."

Another attribute 220 includes the state or status "S" of a node 210. State "S" indicates the node's current state (i.e., OK, WARNING "WN", or ALARM "AL"). The node's state "S" is considered when propagating states to its parent node 210 during processing. Another attribute (not shown) is the particular node 210's depth as identified by the Depth Table discussed previously.

In the examples disclosed herein, a reference count for the OK state is not maintained. In general, maintaining reference counts for N−1 of the N possible states may be all that is necessary in a given implementation because the count for the Nth state can readily be computed by subtracting the reference counts of the N−1 states from the number of children that the node has. Sparse arrays, hash tables keyed on state, and other techniques may also be used to reduce storage requirements. For leaf nodes (i.e., nodes such as L6, L23, and L 42 that have no children nodes), the reference count may be omitted entirely.

Illustrative Example of State Propagation Using Attribute Arrays

Now that the process for propagating impact changes using attributes has been discussed, we now turn to illustrative state propagation examples in directed acyclic graph 205 of FIG. 3. In these illustrative examples, nodes 210 have three possible states of OK, WARNING and ALARM, and the initial state of each node 210 is OK. The OK state is not reference counted. Only leaf nodes (e.g., L6) have a directly settable state, and all other states are computed by the impact function. Furthermore, impact functions compute a node's state as the worst state of any of its direct children, with ALARM being worse than WARNING and with WARNING being worse than OK.

Phase I—Input

In a first propagation phase, the state propagation process receives inputs for calculating state propagation (See Block 130; FIG. 1). The inputs can be a list of objects with their new state. For example, the input can be:

Set-state(L42, "ALARM", L23, "WARNING")

Based on these inputs, the process sets the states for leaf nodes L42 and L23 in FIG. 3 from OK to ALARM and WARNING, respectively.

Phase II—Work List Preparation

In the next propagation phase, the state propagation process prepares a work list to be processed in order of descending depth of task lists (See Block 135; FIG. 1). To create the work list, the process assigns the tasks that have to be performed to task lists at the node's depth to which they apply. The task lists are then sorted within the work list in descending order of depth. In the present example where leaf node L23 is at depth 6 and leaf node L42 is at depth 5, the work list has a task list for depth 6 and a task list for depth 5 and resembles the following:

Depth 6: L23->set_state("WARNING")
Depth 5: L42->set_state("ALARM")

Phase III—Execution

In an execution phase, the state propagation process iteratively executes the task lists within the work list where each iteration processes the task list with the current greatest depth (See Block 140; FIG. 1). The task lists themselves can be unordered, and the operations contained in a single task list can be processed in any order or in parallel.

Figure 4A:
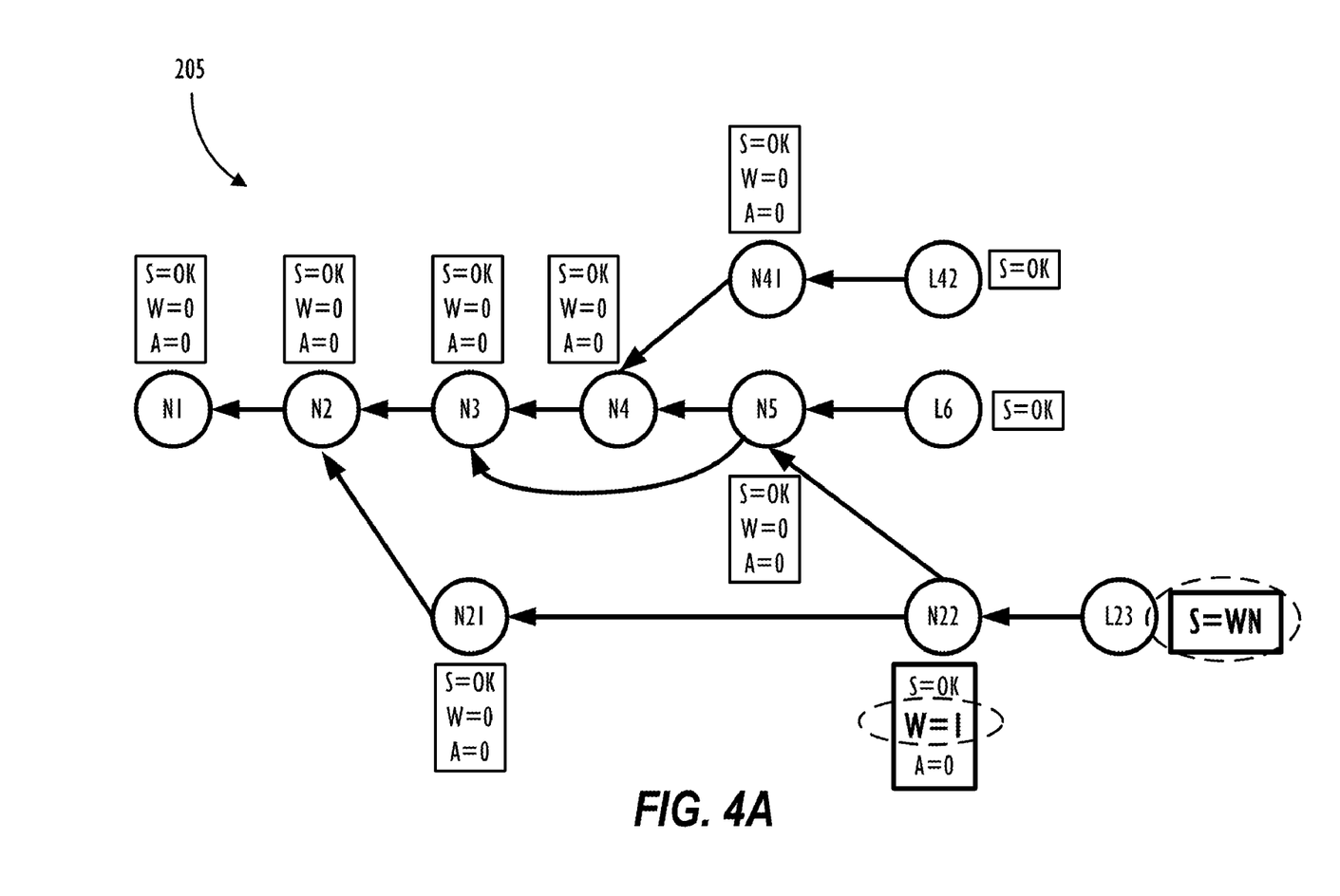
FIG. 4A-4E illustrates various stages in the directed acyclic graph of FIG. 2 with reference counters after state propagation of two leaf node state changes.

In the present example where leaf node L23 is at depth 6 and leaf node L42 is at depth 5, the first task list is for depth 6, and the first operation updates the node L23's state to WARNING, which is reflected in FIG. 4A. When a node changes its state, the operations updates the reference-counts for each of its parent nodes. In addition, the process adds a refresh operation for each parent node to the task list corresponding to the depth of each parent node, so that the parent node's state will be re-calculated (i.e. refreshed) at a later time.

When processing the depth 6 task list, leaf node L23 changed state from OK to WARNING as shown in FIG. 4A. Therefore, the state propagation process increments reference-count[WARNING] on the parent node N22 and adds a refresh task on parent node N22 to the task list for depth 5. The task list at depth 5 of the work list is now:

Depth 5: L42->set_state("ALARM"), N22->refresh

Figure 4B:
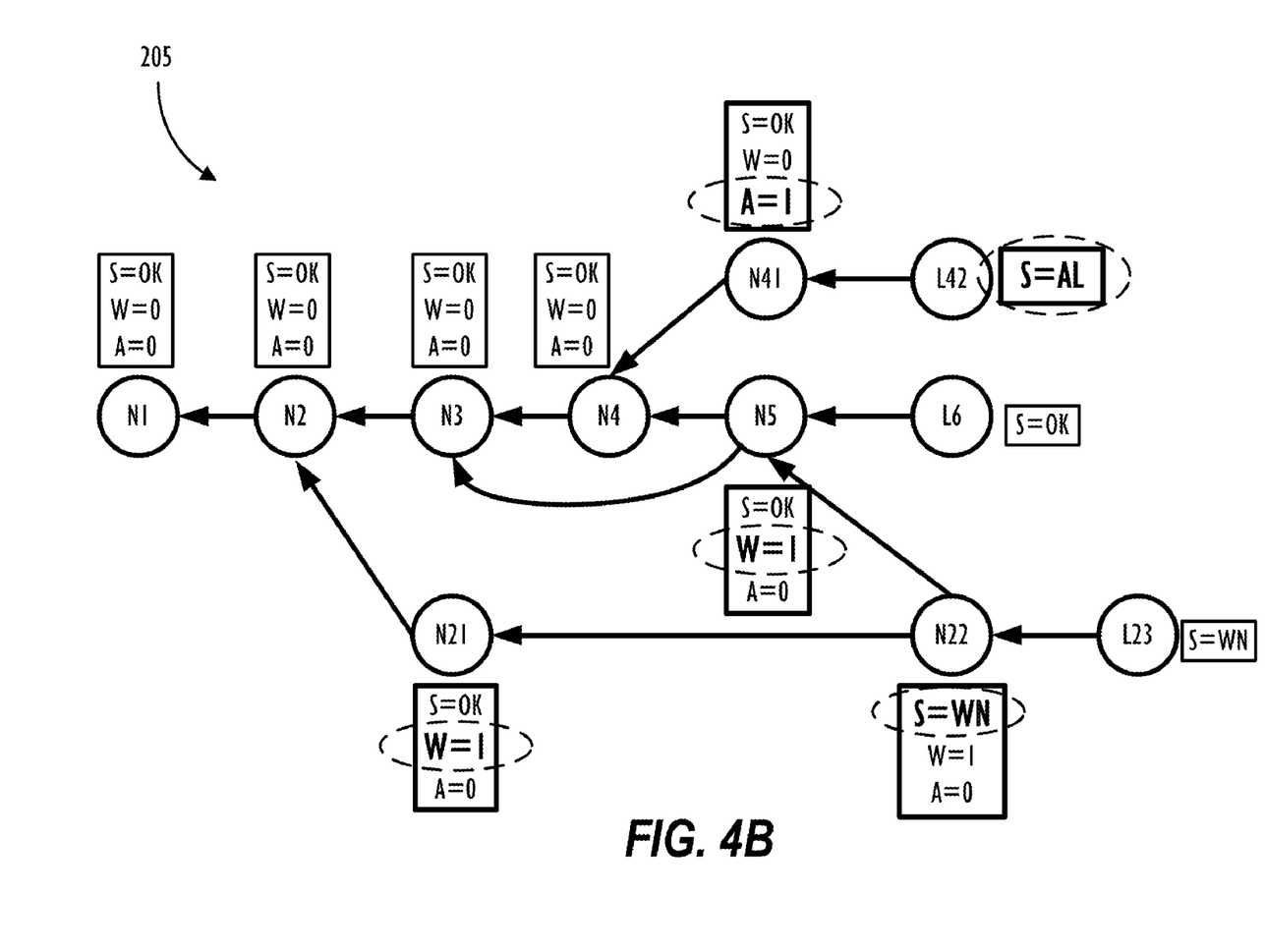

Because there are no more tasks in the depth 6 task list, state propagation moves on to the depth 5 task list. The two tasks in the task list for depth 5 may be executed sequentially or in parallel. At depth 5, the state propagation process change the leaf node L42's state from OK to ALARM, as shown in FIG. 4B. Due to the state change, the process increments the ALARM reference count for parent node N41 and adds, as a result, a refresh operation for N41 to the task list for depth 4.

Also at depth 5, refreshing node N22 involves computing the worst state of its direct children (e.g., leaf node L23). This computation can use a check operation similar to:

```
for (state = ALARM; state > OK ; state--)
    If (reference-count[state] > 0) return(state);
return(OK);
```

In this example, the computation returns WARNING because reference-count[WARNING] was previously incremented by node L23 and is the worst state of node N22's children. Consequently, the process changes node N22's state from OK to WARNING, as reflected in FIG. 4B, and pushes refresh operations for N22's parent nodes N5 and N21 onto the task lists for depths 4 and 2, respectively. The process also increments the reference-count[WARNING] for parent nodes N5 and N21, as reflected in FIG. 4B. At this point, the work list now resembles the following task lists:

Depth 4: N41->refresh, N5->refresh
Depth 2: N21->refresh

As evidenced above, the work list remains sorted in descending order of depth of the task lists, and execution processes the tasks on the highest depth task lists before lower depth tasks. However, propagation tasks at the same level of depth do not affect each other. As long as proper data member protection is applied (e.g., locking or atomic increment/decrement to the reference counts), propagation can be performed in parallel to further improve throughput.

Figure 4C:
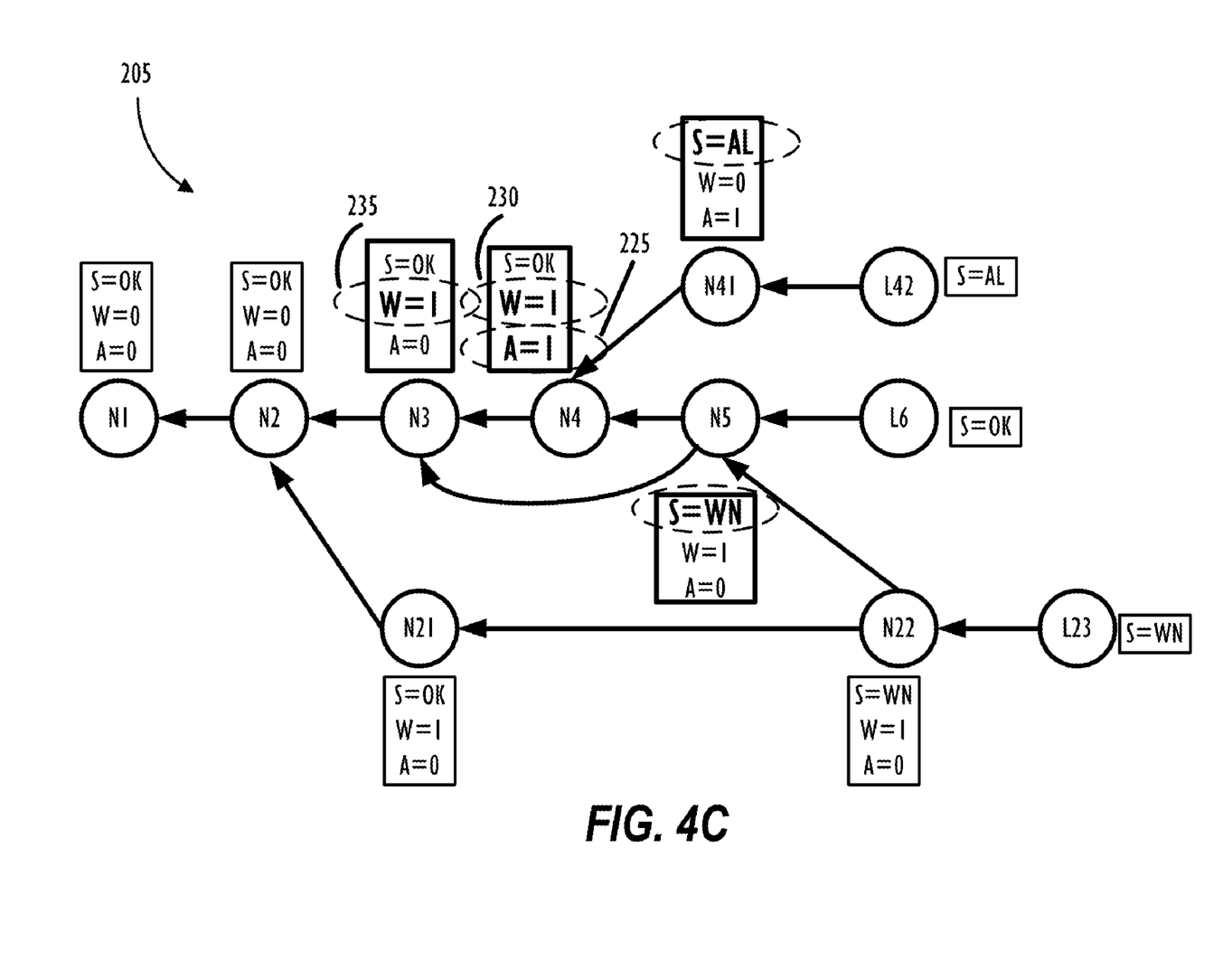

In further executing the work list, the state propagation process now processes the task list for depth 4. The node N41's refresh task calculates a new state of ALARM for node N41 and increments the ALARM reference count for its parent node N4, as reflected by 225 in FIG. 4C. The refresh task of node N5 increments the WARNING reference count for its parent nodes N4 and N3 as reflected by 230 and 235 in FIG. 4C. Refresh tasks for nodes N41 and N5 push a refresh task for node N4 onto the task list for depth 3, and the refresh task for node N5 pushes a refresh task for node N3 onto the task list for depth 2. As a consequence, the work list now resembles:

Depth 3: N4->refresh, N4->refresh
Depth 2: N21->refresh, N3->refresh

Duplicate tasks are removed so the task list for depth 3 is reduced to:

Depth 3: N4->refresh

In a preferred embodiment, the refresh task may be implemented as a bitmap that maps each node to a bit. When a refresh operation is required, the corresponding bit for that node is set to 1. This avoids the need to separately re-duplicate the task list. In any event, the work list now resembles:

Depth 3: N4->refresh
Depth 2: N21->refresh, N3->refresh

Figure 4D:
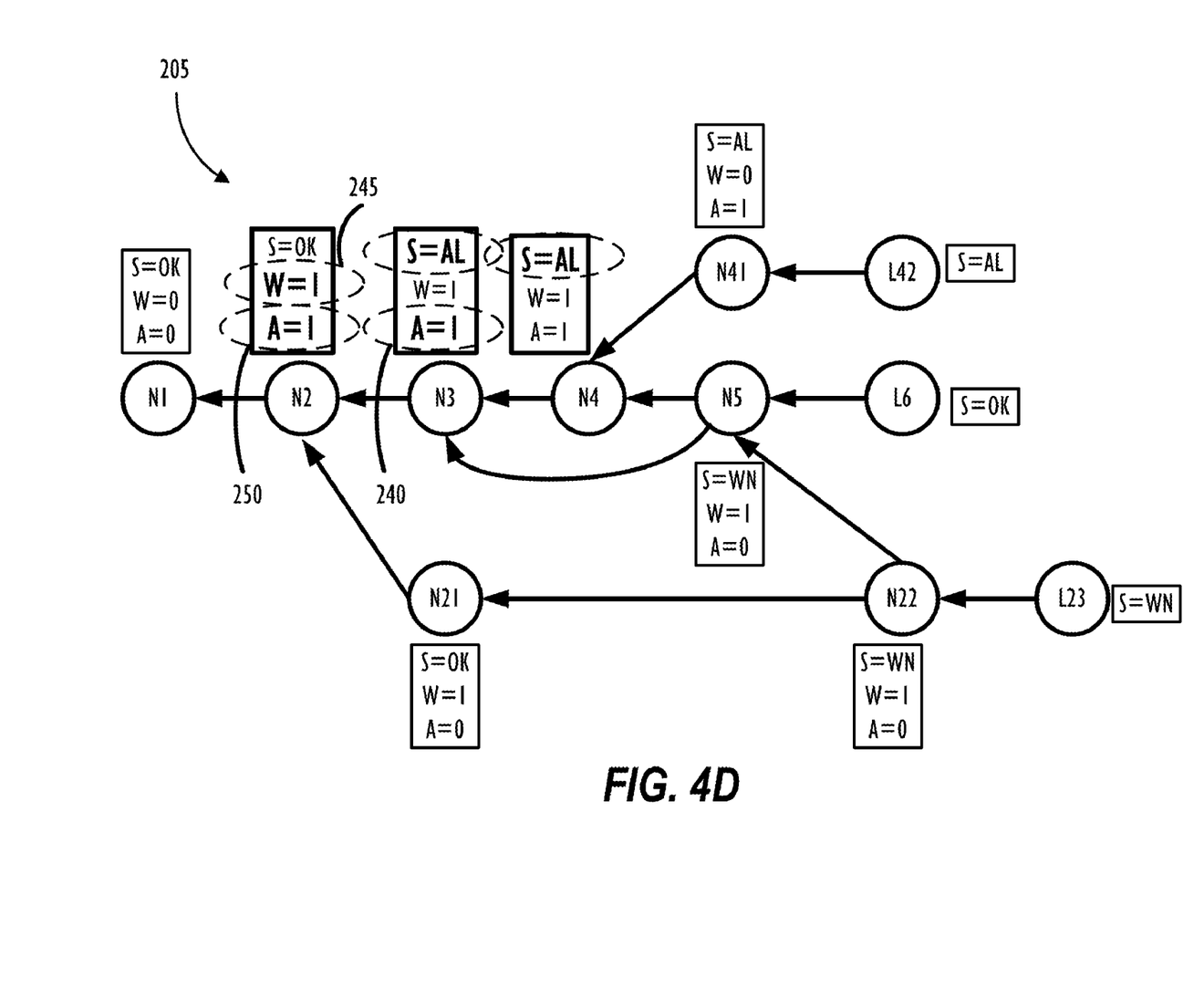

Continuing with the present example, the refresh task on node N4 increments the ALARM reference count for node N3 as reflected by 240 in FIG. 4D and pushes a node N3 refresh task onto the task list for depth 2. After duplicate reduction, the task list for depth 2 has not changed. Processing the depth 2 task list, the refresh task on node N21 increments the WARNING reference count for parent node N2 as reflected by 245 in FIG. 4D and pushes a refresh task for node N2 onto the task list for depth 1. Refreshing node N3 increments the ALARM reference count for its parent node N2 as reflected by 250 of FIG. 4D and pushes a node N2 refresh task onto the task list for depth 1. After duplicate reduction, the work list now resembles:

Depth 1: N2->refresh

Figure 4E:
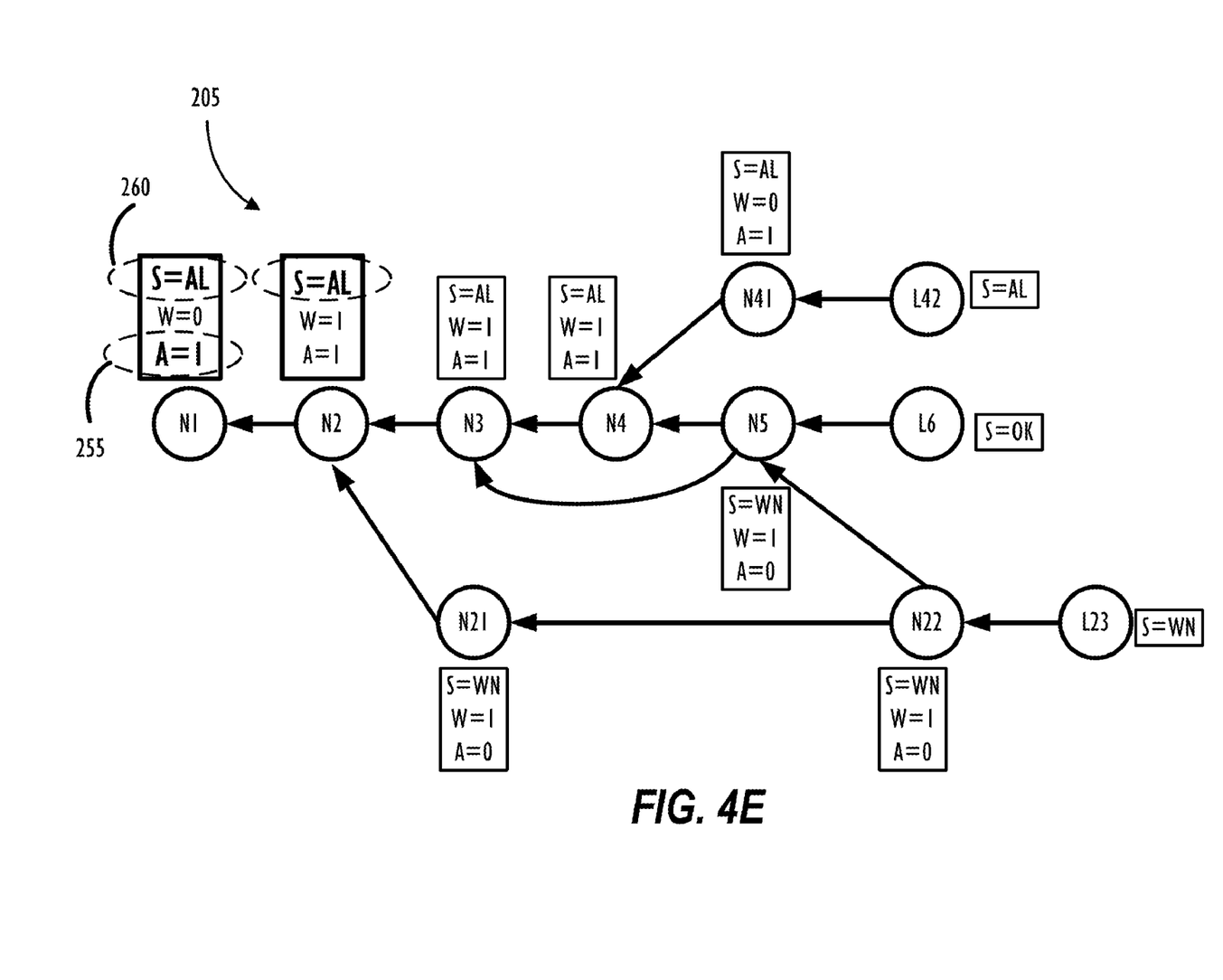

Processing the depth 1 task list, the node N2 refresh task increments the ALARM reference count for N1 as reflected by 255 in FIG. 4E and pushes a refresh task for node N1 on the task list for depth 0. The work list finally resembles:

Depth 0: N1->refresh

Processing the node N1 refresh task sets node N1's state to ALARM as reflected by 260 in FIG. 4E. The resulting graph 205 in FIG. 4E represents the completion of the impact propagation with all the reference counts updated.

Further Examples of Propagation Updates

The previous example of FIGS. 4A-4E will now be extended to illustrate update propagation to graph 205. Consider a first update to graph 205 depicted in FIG. 4E, in which leaf node L6 sets to WARNING. Because leaf node L6 is at depth 5 in graph 205, the state propagation process creates a task list for depth 5 in a work list and pushes the state update onto the created task list. The work list now contains a single task list with a single task, as follows:

Depth 5: L6->set_state("WARNING")

Figure 5:
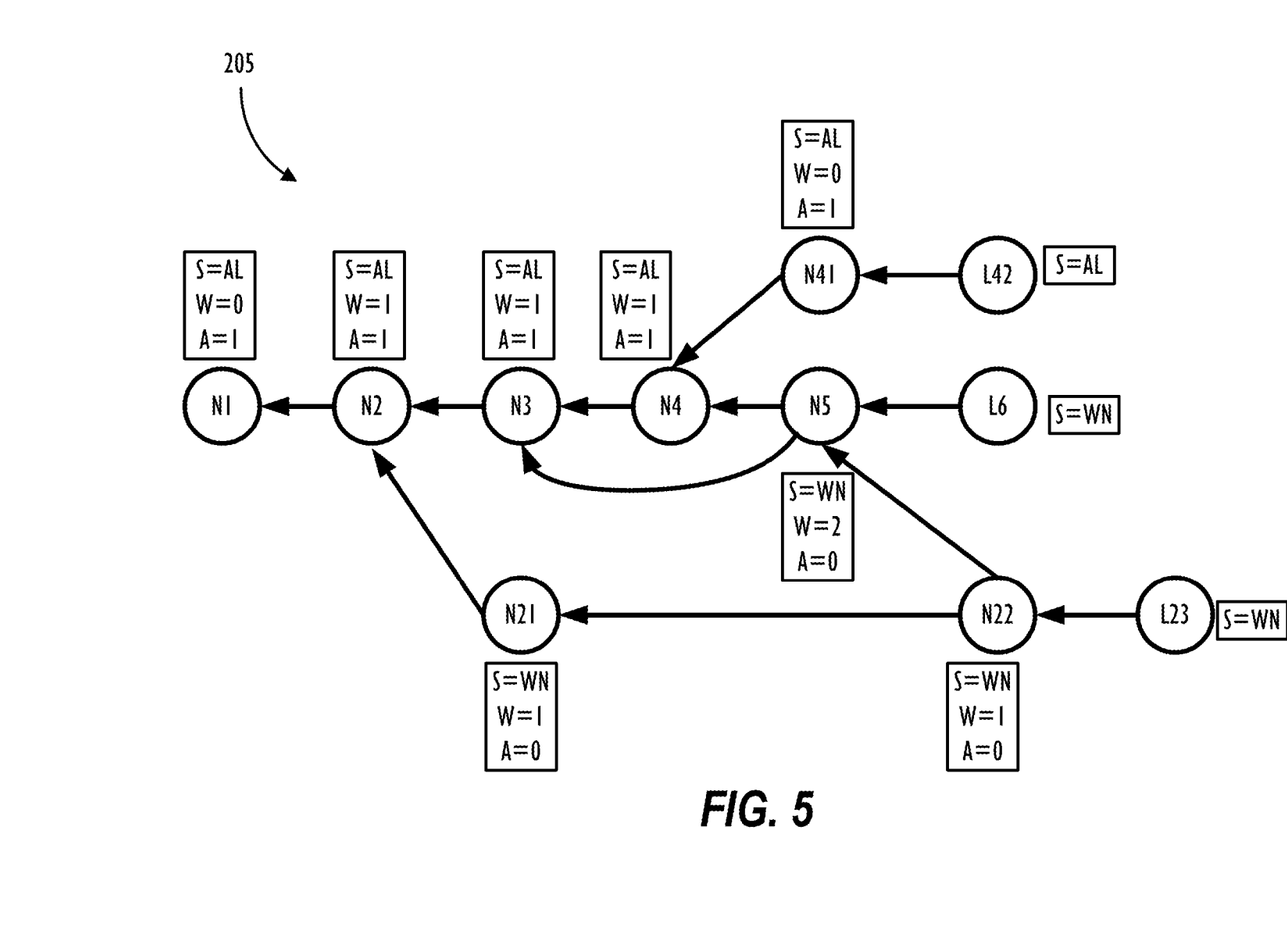
FIG. 5 illustrates a directed acyclic graph with reference counters after state propagation of a single state change.

When the process executes this task, leaf node L6's state changes from OK to WARNING as reflected in FIG. 5. In response to this change, the process increments the reference-count[WARNING] for its parent node N5 to "2" and subsequently pushes a refresh task for node N5 onto the task list for depth 4 (the depth of node N5). When the process executes the refresh task for depth 4, the process determines that node N5's state remains unchanged (WARNING), and the state propagation process therefore ends. Terminating propagation in this manner significantly reduces propagation time by avoiding unnecessary recalculation of upstream nodes. All node states after completion of this work list is shown in FIG. 5.

Figure 6:
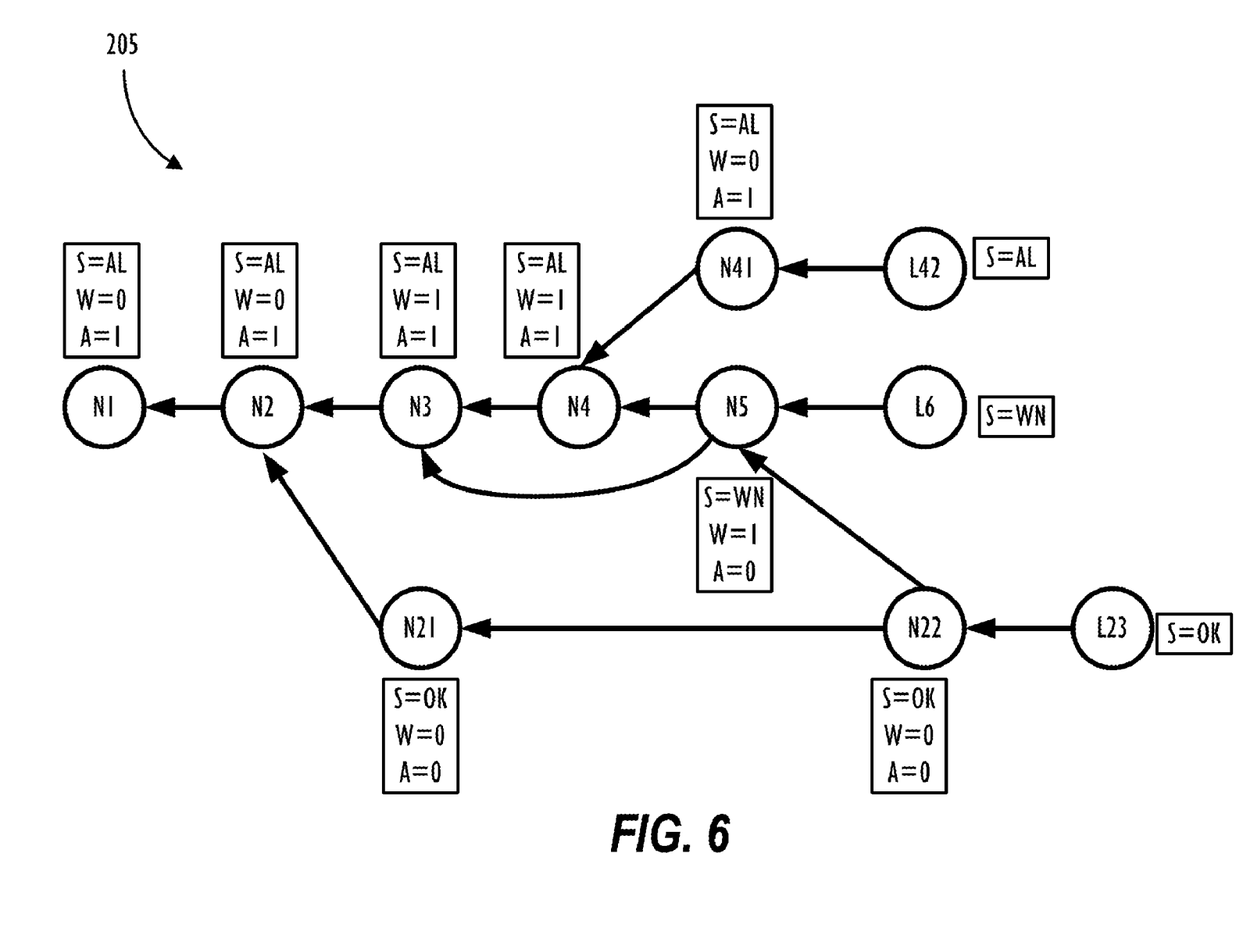
FIG. 6 illustrates a directed acyclic graph with reference counters after a leaf node returns to state OK.

In another example shown in FIG. 6, if the node L23's state now changes to OK. The work list now becomes:

Depth 6: L23->set_state("OK")

When the process changes node L23's state from WARNING to OK, the process decrements the reference-count[WARNING] for its parent node N22 to zero and pushes a refresh task for node N22 onto the work list as follows:

Depth 5: N22->refresh

The process changes Node N22's state from WARNING to OK because its reference-count[WARNING] has dropped to zero. Consequently, the process decrements the reference-count[WARNING] for its parent nodes N5 and N21 and pushes refresh tasks for these two nodes onto the appropriate task lists as follows:

Depth 4: N5->refresh
Depth 2: N21->refresh

When the process executes the depth 4 task list, node N5's state does not change because there is still a reference-count [WARNING] of 1. Therefore, the process terminates propagation from this node N5. When the process executes the depth 2 task list, node N21 changes state from WARNING to OK. Thus, the process decrements node N2's reference-count [WARNING] and pushes a refresh task for node N2 on to the depth 1 task list. When the process executes the depth 1 task list, node N2's state remains ALARM, and propagation terminates. FIG. 6 shows the graph's state at this update's end.

In the previous examples, the propagation demonstrated state changes for single leaf node in separate passes. In an alternate embodiment, the state propagation process can define a batch window to buffer state changes for a period of time to reduce unnecessary processing. For example, an outage of very limited duration (like a server reboot) may not require propagation or alert actions for the system administrators. In this case, the batch window could prevent unnecessary processing because state changes will cancel each other out at the leaf node, causing propagation to terminate.

Furthermore, the state propagation process can use the batch window to group multiple state changes in a small time window together and process them in a single pass of propagation through the directed acyclic graph. Combining multiple updates that occur within the "batch window" can yield efficiency gains. For example, substantial overlap may often occur between sets of impacted nodes that arise from changes to different source nodes. Therefore, combining the updates in a single pass enhances the benefits yielded by parallelization, propagation termination, and execution reduction. Defining the batch window's size can be based on a number of factors, including, but not limited to: the number of changes received, the time since batch window opened, the attributes of incoming changes (e.g. priority), and any combination of these.

During the batch window, the state propagation process accumulates the state changes but does not propagate them. Rather, the process pushes set_state tasks to the appropriate task lists for each state change. After the batch window closes, the process reduces the work list by eliminating duplicate entries. Then, as before, the state propagation process executes the work list and propagates updates to the whole service model in a single pass through graph 205. This prevents multiple updates to the same nodes 210 in graph 205 and minimizes the amount of potentially expensive recalculations.

Various changes in the number of states tracked, as well as in the details of the illustrated operational methods are possible without departing from the scope of the following claims. For example, even though the examples given are directed towards propagation of discrete states, the subject matter of the present disclosure is equally applicable to any situation where the output state of a node in a graph can be calculated using an arbitrary impact calculation function. For example, an impact calculation function could be defined that computes the percentage availability for a node based on the percentage availability and relative weights of each of its child nodes. The decision to terminate propagation could in this case be based on a defined tolerance. For example, if the percentage availability calculated by the function has not changed by more than 1%, then state propagation will not propagate the change of a child to its parents. Furthermore, the illustrative impact propagation can perform the identified propagation steps in an order different from that disclosed here. Alternatively, some embodiments can combine the activities described herein as being separate steps. Similarly, one or more of the described steps may be omitted, depending upon the specific operational environment in which the propagation is being implemented.

Acts in accordance with the impact propagation of this disclosure may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The preceding description is presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

The invention claimed is:

1. A service model impact propagation method, comprising:
   creating a data structure of a service impact model, the data structure having nodes representing components of the service impact model and having impact relationships between at least some of the nodes, each of the nodes having one of at least two states, wherein the at least two states are respectively indicative of at least two operational statuses for their respective node;
   associating one or more counts with at least some of the nodes, each count of the one or more counts for a given one of the nodes representing a number of the nodes having impact relationships with the given node with a respective one of the at least two states, wherein each state of the at least two states comprises one of a respective discrete operational status, a respective range of percentage availability or a respective range of throughput levels;
   changing a state of a first of the nodes;
   propagating impact of the change to counts associated with one or more second nodes having impact relationships with the first node to reflect the change of the state of the first node; and
   determining a state of the one or more second nodes with the counts.

2. The method of claim 1, wherein the data structure comprises a directed acyclic graph having the nodes for the components and having directed edges for the impact relationships.

3. The method of claim 1, wherein associating counts with at least some of the nodes comprises dynamically allocating storage for the counts when needed.

4. The method of claim 1, wherein associating the count for a given one of the nodes is performed only when at least one of the nodes having an impact relationship with the given node has one of the states designated as being tracked.

5. The method of claim 1, wherein each discrete operational status is selected from the group consisting of a warning status, an alarm status, and an OK status.

6. The method of claim 1, wherein propagating impact of the change terminates along the impact relationships at a given one of the second nodes when the state determined for the given node remains unchanged.

7. The method of claim 1, wherein propagating impact of the change to the counts comprises counting, for a given one of the second nodes, a number of other nodes having a given state and having an impact relationship with the given node.

8. The method of claim 1, wherein determining the state of the one or more second nodes with the counts comprises determining the state for a given one of the second nodes from the associated count tracking the state having a highest value.

9. The method of claim 1, wherein determining the state of the one or more second nodes with the counts comprises determining the state for a given one of the second nodes from the associated count tracking the state representing a worst of the at least two states.

10. The method of claim 1, wherein propagating impact of the change comprises generating one or more tasks, each of the tasks based on a depth of the one or more second nodes in the data structure.

11. The method of claim 10, further comprising: collecting the tasks into a work list by depth; and processing each depth in the work list in prioritized order.

12. A program storage device, readable by a programmable control device, comprising instructions stored on the program storage device for causing the programmable control device to implement the method of claim 1.

13. A service model impact propagation method, comprising:
   creating a directed acyclic graph having nodes and directed edges, the nodes representing components of a service impact model, the directed edges representing impact relationships between at least some the components, each of the nodes having one of at least two states, wherein the at least two states are respectively indicative of at least two operational statuses for their respective node;
   associating one or more counts with at least some of the nodes, each count of the one or more counts for a given one of the nodes representing a number of the nodes having impact relationships with the given node with a respective one of the at least two states, wherein each state of the at least two states comprises one of a respective discrete operational status, a respective range of percentage availability or a respective range of throughput levels;
   receiving information about a state change in one or more first nodes;
   propagating impact of the state change to one or more second nodes along the directed edges with the one or more first nodes by:
   updating counts associated with the one or more second nodes to reflect the state change in the one or more first nodes, and determining a state for the one or more second nodes from the updated counts.

14. The method of claim 13, wherein associating the count for a given one of the nodes is performed only when at least one of the nodes having an impact relationship with the given node has one of the states designated as being tracked.

15. The method of claim 13, wherein each discrete operational status is selected from the group consisting of a warning status, an alarm status, and an OK status.

16. The method of claim 13, wherein propagating impact of the change terminates along the directed edges at a given one of the second nodes when the state determined for the given node remains unchanged.

17. The method of claim 13, wherein updating the counts associated with the one or more second nodes comprises counting, for a given one of the second nodes, a number of other nodes having a given state and having an impact relationship with the given node.

18. The method of claim 13, wherein determining the state for the one or more second nodes from the updated counts comprises determining the state for a given one of the second nodes from the associated count tracking the state having a highest value.

19. The method of claim 13, wherein determining the state for the one or more second nodes from the updated counts comprises determining the state for a given one of the second nodes from the associated count tracking the state representing a worst of the at least two states for the given node.

20. The method of claim 13, wherein propagating impact of the change comprises generating one or more tasks, each of the tasks based on a depth of the one or more second nodes in the directed acyclic graph.

21. The method of claim 20, further comprising: collecting the tasks into a work list based on depth; and processing each of the depths in the work list in prioritized order.

22. The method of claim 13, further comprising reducing storage requirements for the counts by using a technique selected from the group consisting of sparse arrays, hash tables, and hash tables keyed on state.

23. The method of claim 22, wherein propagating impact of the change comprises buffering state changes to the one or more first nodes in a batch window.

24. The method of claim 23, wherein buffering the state changes in the batch window comprises grouping the state changes together, and processing the state changes in a single pass of propagation through the directed acyclic graph.

25. A program storage device, readable by a programmable control device, comprising instructions stored on the program storage device for causing the programmable control device to implement the method of claim 13.

* * * * *